(No Model.)
A. E. SPENCER.
CUSHION TIRE FOR VEHICLE WHEELS.
No. 566,032. Patented Aug. 18, 1896.
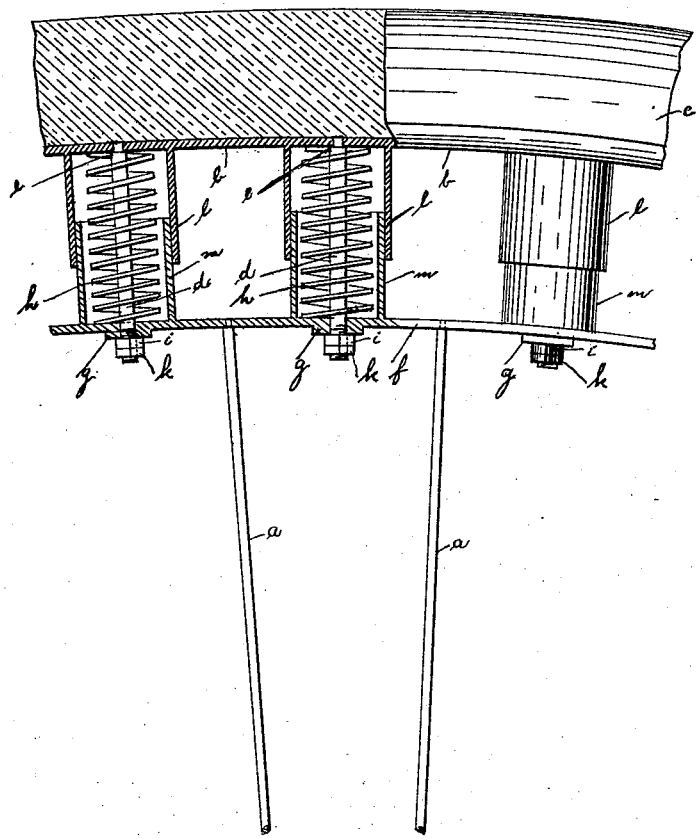
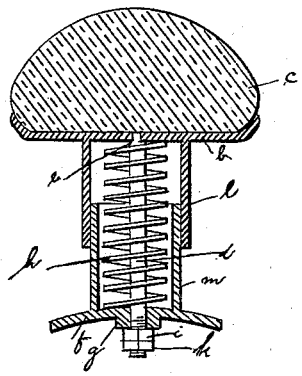
WITNESSES:
John Buckler
F. T. Wentworth.
INVENTOR
Albert E. Spencer
BY Simonds & Frothingham
his ATTORNEYS.

UNITED STATES PATENT OFFICE.

ALBERT E. SPENCER, OF BROOKLYN, NEW YORK.

CUSHION-TIRE FOR VEHICLE-WHEELS.

SPECIFICATION forming part of Letters Patent No. 566,032, dated August 18, 1896.

Application filed October 30, 1895. Serial No. 567,371. (No model.)

*To all whom it may concern:*

Be it known that I, ALBERT E. SPENCER, a citizen of the United States, residing at Brooklyn, in the county of Kings and State of New York, have invented a certain new and useful Improvement in Cushion-Tires for Vehicle-Wheels, of which the following is a specification, reference being had therein to the accompanying drawings.

The object of the invention is to provide a cheap and durable cushion-tire, more especially designed for use in bicycle-wheels, and to take the place of the ordinary pneumatic tire. It is obvious that it may be used in connection with any kind of vehicle-wheels whenever practicable, although it is illustrated only as being applied to a bicycle-wheel.

The advantages of my improved cushion-tire are apparent, in that it is not liable to be punctured by any sharp substance and it can be adjusted to any degree of elasticity or resiliency, as hereinafter indicated.

The invention consists in the novel features of construction hereinafter set forth and described, and more particularly pointed out in the claims hereto appended.

Referring to the drawings, Figure 1 is a view, partly in section and partly in elevation, of my improved tire. Fig. 2 is a view in cross-section of said tire.

Like letters refer to like parts in both the views.

$a$ denotes the spokes, of ordinary construction; $b$, the outer rim, made, preferably, of metal and slightly concave in shape on its outer surface for the purpose of securely retaining the tire or tread $c$, composed of rubber, leather, or other suitable resilient material, so that it will not slip off.

$d\ d$ denote a series of bolts, the outer ends of which are slightly smaller than their bodies, thus forming shoulders $e\ e$. The outer ends of these bolts pass through the outer rim and are securely riveted thereto, as indicated in the drawings, the said shoulders forming a rest or support for the said rim.

$f$ denotes an inner rim, made, preferably, of light-weight metal, and $g\ g$ are shoulders thereon, which serve not only to strengthen the rim at that particular point, but also as a bearing for the adjusting and locking mechanism, as hereinafter set forth.

$h\ h$ are springs, made, preferably, of flat steel, coiled about the bolts with their ends resting upon the inner and outer rims. The bolts $d\ d$ pass through the inner rim and the shoulders $g\ g$ thereon and are free to move up and down, so that the tension of the springs may be adjusted to any desired degree by screwing the nuts $i\ i$ upon the inner ends of said bolts. $k\ k$ denote nuts on the inner ends of said bolts for locking the nuts $i\ i$ and keeping them in proper position.

$l$ is a metal sleeve or cover, preferably circular in shape, composed of light-weight metal or other suitable material, securely attached to the under side of the outer rim and extending inwardly around a portion of the bolt and spring. $m$ is also a sleeve or cover similar in shape to the sleeve $l$, only a little smaller in diameter than the sleeve $l$ and adapted to fit into the sleeve $l$, after the manner of a telescope, so to speak. This sleeve $m$ surrounds a portion of the bolt and spring. The object of these covers which form a telescopic casing, so to speak, is to prevent the dust, dirt, &c., from entering into the inside mechanism and clogging the springs.

When the springs of the cushion-tire are properly adjusted, the distance between the outer and inner rims will be about an inch or an inch and a quarter, although, of course, the distance will vary somewhat therefrom, according to the degree of elasticity desired.

What I claim, and desire to secure by Letters Patent, is—

1. In a cushion-tire for wheels, the combination of the rim $b$, the rim $f$, the bolts $d\ d$, the helical springs $h\ h$, means for adjusting the tension of said springs, and a telescopic cover for each spring; substantially as described and for the purposes set forth.

2. In a cushion-tire for wheels, the combination of the rim $b$, rim $f$, movable bolts $d\ d$, having their outer ends securely fastened to the rim $b$, and their inner ends free to move and play through apertures in the rim $f$, springs $h\ h$, and a telescopic cover for each spring, all substantially as described and for the purposes set forth.

In witness whereof I have hereto affixed my signature, in the presence of two witnesses, this 29th day of October, 1895.

ALBERT E. SPENCER.

Witnesses:
N. L. FROTHINGHAM,
F. T. WENTWORTH.